(12) United States Patent
Saffre et al.

(10) Patent No.: US 7,930,403 B2
(45) Date of Patent: Apr. 19, 2011

(54) ALLOCATION OF NETWORK RESOURCES

(75) Inventors: Fabrice T. P. Saffre, Ipswich (GB);
Mark A Shackleton, Ipswich (GB)

(73) Assignee: British Telecommunications public limited company, London (GB)

( * ) Notice: Subject to any disclaimer, the term of this patent is extended or adjusted under 35 U.S.C. 154(b) by 43 days.

(21) Appl. No.: 12/521,888

(22) PCT Filed: Jan. 2, 2008

(86) PCT No.: PCT/GB2008/000009
§ 371 (c)(1),
(2), (4) Date: Jul. 1, 2009

(87) PCT Pub. No.: WO2008/081184
PCT Pub. Date: Jul. 10, 2008

(65) Prior Publication Data
US 2010/0023623 A1    Jan. 28, 2010

(30) Foreign Application Priority Data
Jan. 3, 2007    (EP) .................................. 07250004

(51) Int. Cl.
*G06F 15/16*    (2006.01)
(52) U.S. Cl. ........ 709/226; 709/223; 709/246; 709/207; 709/229; 709/206; 709/217; 709/212; 709/230; 709/235

(58) Field of Classification Search .......... 709/217–229, 709/230, 235, 207, 206, 212, 213, 200–203, 709/246
See application file for complete search history.

(56) References Cited

U.S. PATENT DOCUMENTS 6,199,124 B1 *  3/2001  Ramakrishnan et al. ....... 710/40
2002/0062376 A1 *  5/2002  Isoyama ....................... 709/226

OTHER PUBLICATIONS

European Search Report dated Nov. 22, 2007 in EP 07250004.4.
International Search Report mailed Apr. 29, 2009 for PCT/GB2008/000009.
Fabrice Saffre and Mark Shackleton, "B³: intelligent bandwidth micro-management for the"connected home, Consumer Communications and Networking Conference, 2007. CCNC 2007, 4th IEEE, Jan. 2007, p. 1198, Las Vegas, NV, USA, ISBN: 01-4244-0667-6.
International Search Report for PCT/GB2008/000009, mailed Apr. 28, 2008.

* cited by examiner

*Primary Examiner* — Jude J Jean Gilles
(74) *Attorney, Agent, or Firm* — Nixon & Vanderhye P.C.

(57) ABSTRACT

Methods and systems for allocating a network resource such as bandwidth between a plurality of network applications, comprising steps of obtaining, for each of said plurality of network applications, parameters defining a quality function indicative of quality of service obtainable as a function of the amount of said network resource available to that network application; and dividing a total available amount of said network resource into respective individual allocations to allocate to each respective network application such as to maximise a combined quality measure derived from a weighted sum of said quality functions.

10 Claims, 4 Drawing Sheets

ALLOCATION OF NETWORK RESOURCES

This application is the U.S. national phase of International Application No. PCT/GB2008/000009, filed 2 Jan. 2008, which designated the U.S. and claims priority to Europe Application No. 07250004.4 filed 3 Jan. 2007, the entire contents of each of which are hereby incorporated by reference.

TECHNICAL FIELD

The present invention relates to methods and systems for the allocation of a network resource between a plurality of network applications. In particular, but not exclusively, embodiments of the present invention relate to the allocation of a network resource such as the resource often referred to in relation to the digital communications and computing fields as "bandwidth", in relation to scenarios such as allocating "bandwidth" to websites or applications running on devices in a network. In such contexts, the term bandwidth often refers to the rate at which data can be transmitted between different networked devices or between devices and a network or a "hub" device to which they are connected, wirelessly by means of radio-frequency communication channels for example, or otherwise. In general, therefore, the term often refers to rate (i.e. data/time) of data transfer over a period that may be of the order of a second or less, but may also be measured over a period of the order of a day, a week or even a month for example.

BACKGROUND TO THE INVENTION AND PRIOR ART

Introduction

With the development of the "connected home" and "liquid bandwidth" paradigms, there is a distinct need for simple methods to manage quality of service (QoS) across a plurality of applications at the end user level (i.e. within the confines of an individual subscriber's environment). These methods and their implementation generally need to satisfy two fundamental properties:

They should ideally be capable of dealing with the fact that different network applications have different QoS requirements and that QoS cannot always be measured using simple technical criteria (e.g. packet loss, jitter . . . )

They should ideally be simple and robust enough to be able to run autonomously on "home hub" type network devices, for example, and possibly resolve unforeseen multi-application conflicts in a satisfactory manner.

The traditional approach to avoiding such conflicts, though usually not used in a micro-management context, is admission control. This simply means that a new process will only be allowed, or be allocated bandwidth, if there is enough bandwidth to achieve the desired QoS for the new application without compromising that of on-going processes (a very similar logic to "first-come-first-served").

It has been argued in the past that more subtle criteria such as the individual history, in terms of bandwidth consumption, of a process's owner should be taken into account to avoid unfair "hogging" of network resources by a minority of users. Other solutions include congestion-based charging, which basically involves tracking the adverse impact that users/applications have on bandwidth availability then discouraging disruptive utilisation of the resource by raising its price accordingly.

Crude Bandwidth Allocation Methods:

Before going on to describe embodiments of the present invention in detail, we present two very crude bandwidth allocation methods that could be used as an alternative to the solution proposed, in order to demonstrate their shortcomings. These two methods will be referred to respectively as:

Equal share; and

Proportional share

These methods are known to be unsatisfactory, and "equal share" in particular is unlikely ever to be envisaged as a viable option. The "proportional share" allocation logic is not such a remote possibility, as it is in fact close to the situation that would present itself in the absence of any form of QoS management. In any case, it will be understood that these two methods are presented primarily for illustration and comparison purposes.

As its name implies, the equal share method simply means that the amount of bandwidth reserved for each application is equally divided between all concurrent processes, independent of their type. So, if there are n processes:

$$b_1 = b_2 = \ldots = b_n = \frac{B}{n} \quad (1)$$

where $b_i$ is the share of the bandwidth allocated to Process-i and B is the total available bandwidth. This is of course extremely wasteful and inefficient if the bandwidth requirements for these processes are not identical (e.g. Process-1 could be a streaming video application and Process-2 a web browser, in which case it would be absurd to allocate the same share of the resource to each of them).

The proportional share method means that all processes receive the same fraction of their respective target bandwidth, while respecting the constraint that total consumption across all concurrent processes cannot be larger than the available bandwidth. So in effect:

$$b_i = \gamma t_i \quad (2)$$

$$\sum_{i=1}^{n} b_i \leq B$$

where γ is the fraction (between 0 and 1) and $t_i$ is the target bandwidth of process i (as defined by the type of application it belongs to). This second method is obviously not agnostic to the unique requirements of each application type (unlike the equal share option) but, critically, it does not take into account the quantitative impact on QoS of a given reduction of the allocated bandwidth compared to the target.

The above two methods could each be said to be aiming for a "fair" allocation of resources, but simply from the fact that they lead to different allocations and different results while both apparently aiming for "fairness", it will be understood that "fairness" is by no means an objective criteria, and the mere fact that a particular method is aiming for an allocation that may be described as "fair" according to some subjectively-chosen criteria is no guarantee that it will lead to results that will be desirable in respect of all, some or even any of a plurality of network applications, or to one or more users of such a plurality of network applications.

Referring briefly to prior patent documents, U.S. Pat. No. 6,404,738 ("Reininger et al") relates to a dynamic network bandwidth allocation method for multimedia applications with soft quality-of-service ("soft-QoS") requirements. Soft- QoS is defined by a satisfaction index (a number that rates users' perceptual quality) and a softness profile (a function that captures the robustness of multimedia applications to network congestion). A soft-QoS controller uses the softness profiles to compute a bandwidth allocation that maximizes the minimum satisfaction index of active connections.

US2003/0120780 ("Zhu et al") relates to network resource assignment systems and methods. One such method involves establishing a resource model, acquiring an application model, and utilising a mapping process to map said application model onto said resource model. The resources are assigned to optimise the assignment of resources with respect to application requirements and desired objectives, such as minimisation of the average communication delay inside a service core.

SUMMARY OF THE INVENTION

According to the present invention, there is provided a method of allocating a network resource between a plurality of network applications, comprising:
obtaining, for each of said plurality of network applications, parameters defining a quality function indicative of quality of service obtainable as a function of the amount of said network resource available to that network application, said parameters comprising:
(i) a first measure indicative of a target amount of said network resource that said application requires in order for said application to perform at a level substantially at or above a first predetermined performance level;
(ii) a second measure indicative of a threshold amount of said network resource that said application requires in order for said application to perform at a level substantially at or above a second predetermined performance level, said second predetermined performance level being lower than said first predetermined performance level;
(iii) a performance change rate measure indicative of a rate of change of a predetermined measure of performance of said application with respect to amount of said network resource allocated to said application;
then allocating proportions of said network resource respectively to each of said network applications in such a way as to optimise a predetermined function dependent on said first measures, said second measures and said performance change rate measures obtained in respect of each of said plurality of network applications.

Also according to the present invention, there is provided a corresponding apparatus for allocating a network resource between a plurality of network applications, comprising:
parameter obtaining means arranged to obtain, for each of said plurality of network applications, parameters defining a quality function indicative of quality of service obtainable as a function of the amount of said network resource available to that network application, said parameters comprising:
(i) a first measure indicative of a target amount of said network resource that said application requires in order for said application to perform at a level substantially at or above a first predetermined performance level;
(ii) a second measure indicative of a threshold amount of said network resource that said application requires in order for said application to perform at a level substantially at or above a second predetermined performance level, said second predetermined performance level being lower than said first predetermined performance level;
(iii) a performance change rate measure indicative of a rate of change of a predetermined measure of performance of said application with respect to amount of said network resource allocated to said application; and
allocating means arranged to allocate proportions of said network resource respectively to each of said network applications in such a way as to optimise a predetermined function dependent on said first measures, said second measures and said performance change rate measures obtained in respect of each of said plurality of network applications.

Embodiments of the present invention do not necessarily relate specifically and exclusively to "fairness", but may aim to provide the means for optimising average QoS across a plurality of applications with different requirements. They may be designed to replace cruder methods of distributing the available bandwidth between competing processes whenever admission control is judged unsuitable or undesirable and all process owners have identical priority (the simplest case being that all processes belong to the same user).

Embodiments of the present invention may be fairly lightweight and straightforward, and may be able to be run on a simple piece of hardware such as a domestic router—other embodiments may run on a personal computer or on a dedicated device. Preferred embodiments may have prioritisation capabilities (e.g. weighted round-robin).

According to preferred embodiments, in the event that a sufficient amount of said network resource is available to allocate, to each of said network applications, the respective threshold amount of said network resource, but an insufficient amount of said network resource is available to allocate, to each of said network applications, the respective target amount of said network resource, the allocating comprises:
allocating to each of said network applications the respective threshold amount of said network resource;
dividing a remaining amount of said network resource into a plurality of additional allocations;
determining, with reference to one or more of said parameters in respect of each network application, the network application whose quality function would change in such a way as to be indicative of the greatest increase in quality of service were that network application to be allocated one of said additional allocations, and allocating one of said additional allocations to that network application; and
repeating the previous step in respect of successive ones of said additional allocations until said plurality of additional allocations have each been allocated.

Preferred embodiments of the present invention may not only be capable of dealing with the fact that different network applications have different QoS requirements and that QoS cannot always be measured using simple technical criteria (e.g. packet loss, jitter . . . ) but may also take into account QoS as it is likely to be perceived by the user, while still being simple and robust enough to be able to run autonomously on "home hub" type devices, for example, and possibly resolving unforeseen multi-application conflicts in a satisfactory manner.

According to preferred embodiments of the invention, the network resource comprises bandwidth, where the term refers to a measure of the rate at which data is transferred. It will be understood that while this term will generally be used in this sense, and should be interpreted in this sense unless stated otherwise, embodiments of the invention are foreseeable in which the network resource to be allocated is bandwidth in the more traditional "radio communications" sense of the range of frequencies occupied by a modulated carrier wave, or a measure of how wide a function is in the frequency domain.

According to alternative embodiments of the invention, the network resource may instead or additionally comprise a data processing capability, such as processing power or processing cycles of a central processing unit of a network, or other types of resource.

Preferred embodiments of the invention as described are primarily concerned with allocating "download" bandwidth, but embodiments of the invention are applicable in a similar manner in relation to "upload" bandwidth. The parameter values may need to be changed, and each application may have both upload and download target, threshold and slope parameters. Instead of the slope parameter, one or more other parameters could be used in relation to the chosen mathematical representation of the rate of change (degradation or improvement) of (perceived) QoS with respect to amount of the relevant network resource allocated to the application.

Preferred embodiments of the invention are primarily applicable in relation to real-time network applications such as media streaming, gaming and other such processes that consume bandwidth at a predefined target rate between launch and termination, both events being triggered by the user. Another class of applications exists, an example of which is file downloading, for which the process "naturally" terminates when a given amount of information has been received or sent. For applications of this type, embodiments of the invention may be used for resource allocation using specific QoS functions based for example on the size of a file to be transferred and the acceptable download time defined by the user (e.g. "I want this movie ready to play in 5 minutes"). This may be achieved by, for example, defining a threshold by dividing the file size by the delay, and defining target by multiplying the result by a constant>1 and then using a very high slope value so that the QoS variation around the threshold is fairly steep. The result is that the file has a high probability of having been fully transferred before the user-specified deadline (the QoS measurement effectively reflecting that probability).

According to some embodiments, the allocation of network resources may be achieved using fully computational techniques, but depending on the complexity of the quality functions used and the amount of network applications "competing" for shares of available network resources, a numerical iteration procedure may be more appropriate than a fully computational optimisation technique.

It will be understood that there may be situations in which all applications will be near to their respective thresholds due to low availability of resources, but where "abandoning" only one (or maybe a few) of those applications would benefit the overall or average QoS of the rest substantially. In this case it may be appropriate for a suitably arranged embodiment to provide an ad hoc recommendation to perform the equivalent of "retrospective admission control", allowing users to accept or refuse the recommendation.

It will be understood that there may only be one user of the various devices in the network, or more than one user. It will also be understood that each hardware device may be running just one network application, or two or more network applications concurrently. Different embodiments of the invention may be applicable to situations with one user or more than one user, and to situations in which various different network applications are running on just one, or more than one hardware device.

BRIEF DESCRIPTION OF THE DRAWINGS

Preferred embodiments of the present invention will now be described with reference to the appended drawings, in which.

DESCRIPTION OF THE EMBODIMENTS

Figure 1:
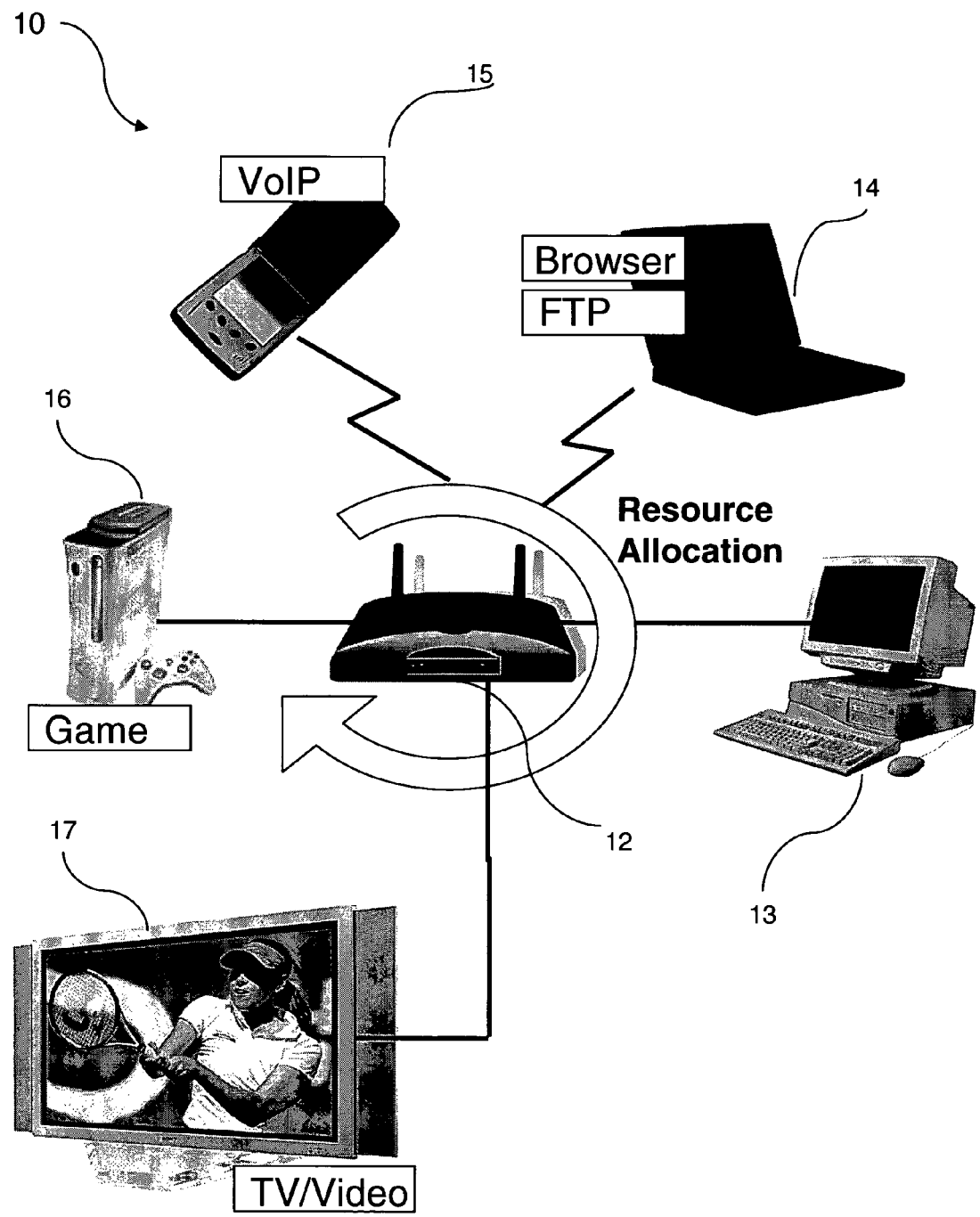
FIG. 1 shows a home network in relation to which a network resource allocation method according to an embodiment of the invention may be used.

With reference to FIG. 1, there is shown an example of a home network 10. This is centred on a broadband hub device 12, which may serve as the gateway to and from the Internet or another "external" network, as well as a router (wireless or otherwise) and firewall for the home network. Various devices may be arranged to be in communication with the hub device 12, such as a desktop computer 13, a laptop computer 14, a telephone handset 15, a gaming device 16, and a television set 17. Some of these devices may be connected to the hub device 12 by wire (in this example, the desktop computer 13, the gaming device 16, and the television set 17) while others may be set up to communicate the hub device 12 wirelessly (in this example, the laptop computer 14 and the telephone handset 15). Each of these devices may run one or more of a variety of network and other applications, using Internet Protocol (IP) or other network protocols in their communications. In the example shown, the desktop computer 13 and laptop computer 14 may each run a variety of applications including internet browsing applications and/or file-sharing applications using File Transfer Protocol (FTP); the telephone handset 15 may be able to act not only as a handset for a public switched telephone network (PSTN) "landline" but also as a "Voice over Internet Protocol" (VoIP) device, allowing for routing of voice conversations over the Internet or through another IP-based network; the gaming device 16 may be arranged for the running of video game applications for online gaming, involving players linked via the Internet; and the television set 17 may be equipped to operate not only in conjunction with signals received via an aerial but also as a "Video On Demand" (VOD) system arranged to operate in conjunction with signals received by the network via a broadband internet connection. Such VOD systems allow users to select and watch video content over a network as part of an interactive television system, either "streaming" content for immediate viewing or "downloading" it, in which case a program may be brought in its entirety to a set-top box before viewing starts.

In the network of FIG. 1, the broadband hub device 12 is shown additionally serving as a "bandwidth broker" (or "bit-rate broker"). The functionality of the bandwidth broker will be explained later, however it should be noted that this functionality need not be performed by the hub device 12. It may be performed instead by the desktop computer 13, the laptop computer 14, or a separate dedicated device, for example. In this case, the hub 12 may simply serve the function of enforcing the bandwidth allocation profile computed by the separate device.

Each of the above network applications above may have different requirements in relation to network resources, an important one of which is its required "bandwidth", which, as has been explained earlier, generally refers to the rate at which a network application requires data to be transmitted in order for it to run. The network applications may also have requirements in relation to other types of network resource, such as the processing power of a central processing unit in the network, for example, or a supply power such as electrical power in situations where a limited amount of power is available to be shared between network applications running on devices in a network which are accessible/programmable via the network", for example. Each network application may be thought of as having a "target" amount of bandwidth (or other network resource, as applicable), this being the amount of bandwidth required by that application for it to perform sufficiently well (i.e. smoothly, reliably, or according to one or more other criteria) and/or at a sufficient rate for a user of that application to be completely satisfied with its operation. When forced to operate with an amount of bandwidth below this "target" amount, a network application may still perform at an acceptable but sub-optimal level, which may result in a user being sufficiently satisfied to accept the performance level of the application, but less than completely satisfied with its operation, or at an unacceptable level, which may result in a user being unsatisfied with its operation. Each network application may be therefore also be thought of as having a "threshold" amount of bandwidth, this being the amount separating an acceptable and an unacceptable performance level or quality of service (QoS).

The extent to which a user's perception of the performance level of a network application decreases as the application is forced to operate with an amount of bandwidth or other network resource below its target amount depends to a large extent on the type of application. With reference again to FIG. 1, if the user is using television set 17 to watch a film received by means of a video streaming application, this would in general have a high target bandwidth, and while a small reduction below this may not be noticeable to the user at all, if available bandwidth were to be further reduced, there may come a point at which the picture may appear to freeze, or move from one still image or frame to another while missing out several intermediate frames on the way, and a user would decide that it is not worth continuing with watching the film. Such a network application could this be characterised by a high target bandwidth, abrupt QoS degradation with reduction in available bandwidth, and a low tolerance to even small perturbations. The telephone handset 15, when acting as a VoIP device, may have a lower target bandwidth, but may also have abrupt QoS degradation or perceived QoS degradation and low tolerance to small perturbations. On the other hand, an application such as a web browser running on the laptop computer 14 may have a relatively low target bandwidth, and while any reduction below this may lead to the application running appreciably slower, there would in general not be a similarly abrupt drop in (perceived) QoS.

It will be understood that the parameters in respect of a particular network application may also be dependent on an end user's current context, device, current use of a device, or a personal user profile. For example:

when on a Personal Digital Assistant (PDA) device, a user will generally want and need less bandwidth for a video application than for a video application on a High-Definition television (HDTV).

when a user is in a noisy environment, high sound fidelity may matter less.

a user may be more tolerant of poor image quality for a speech-based television programme such as a news programme than for an image-based television programme such as a wildlife programme.

A user may be willing to accept poor quality in respect of some television programmes that the user does not want to miss completely, while preferring to miss others altogether.

Children may have a higher tolerance of low performance levels in respect of the same network application than their parents (or vice versa); there may be a "profile" per user that maps out their expectations/trade-offs along the above lines.

As will become evident, embodiments of the present invention may take account of any of the above factors.

QoS-Based Comparison

In order to allow allocation of bandwidth between multiple applications or processes to be managed so as to maximise average QoS in accordance with a preferred embodiment of the invention, it is desirable to define a single function that effectively allows comparison of performance across multiple applications as perceived by the user. An expression such as the following has been found to be particularly suitable in portraying QoS degradation:

$$QoS_i = \frac{1}{1 + \left(\frac{t_i - b_i}{t_i k_i}\right)^{\alpha_i}} = \frac{k_i^{\alpha_i} t_i^{\alpha_i}}{k_i^{\alpha_i} t_i^{\alpha_i} + (t_i - b_i)^{\alpha_i}} \quad (3)$$

where $k_i$, $t_i$ and $\alpha_i$ jointly characterise the application-specific QoS requirements and degradation profile. The parameters of expression (3) may be derived from experimental data collected for the respective application types. They may also be dependent on or take account of user profile dependent or other contributions in order to take account of factors such as those set out in the previous section. In the expression above, however, $t_i$ is the target bandwidth (i.e. the amount that the application seeks to obtain), while $k_i$ represents the fraction of the target bandwidth which, when subtracted from $t_i$, results in the QoS dropping to a threshold level, such as 50% of the maximum, and $\alpha_i$ represents a measure of the "abruptness" of the QoS degradation when approaching that critical value.

For instance, in practical terms, a video streaming application would in general be characterised by high values of t and α and a low value of k, together reflecting its high bandwidth requirements, abrupt QoS degradation and low tolerance even to small perturbations. Symmetrically, a more lightweight and "forgiving" application such as a web browser, for example, could be characterised by low values of t and α, and a high value of k. An e-mail server would be even more forgiving. It will be understood that this framework can accommodate a wide diversity of responses to bandwidth shortage between such extremes.

Figure 2:
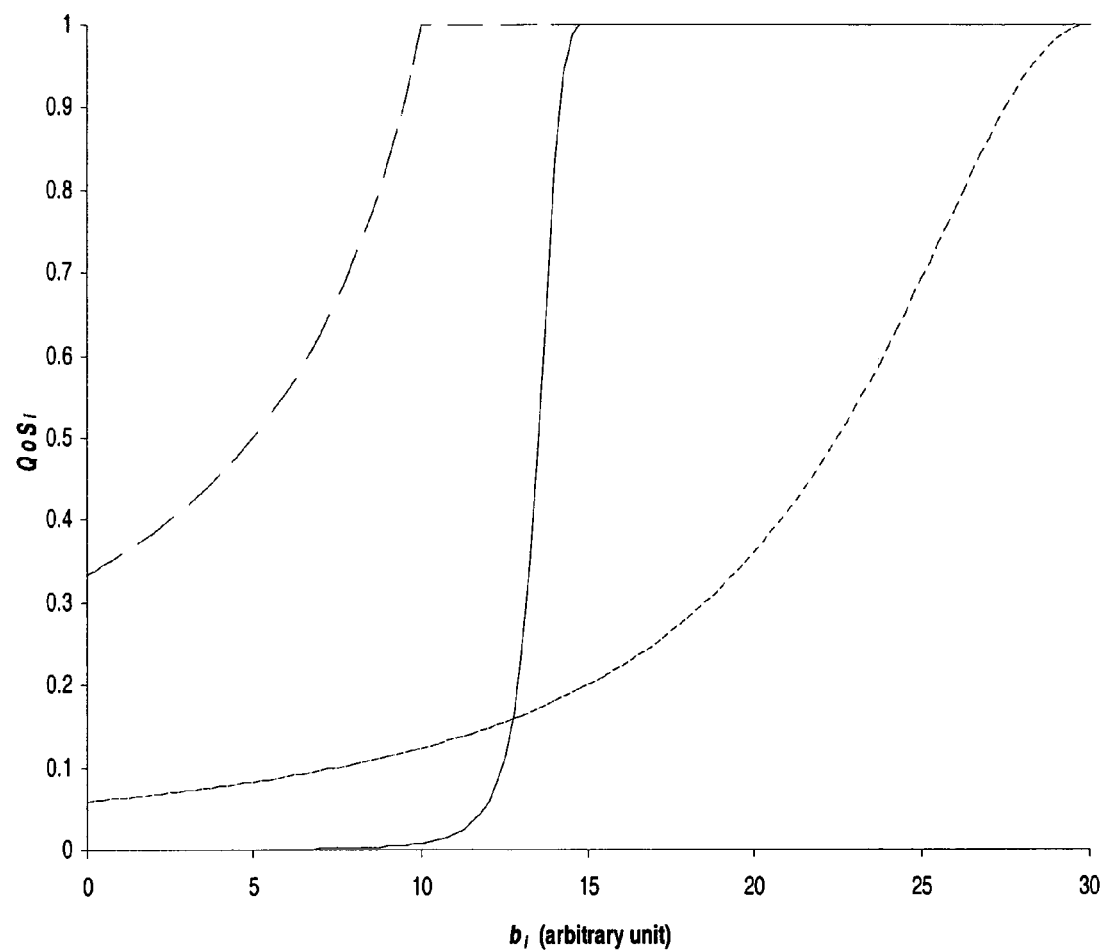
FIG. 2 illustrates Quality of Service evolution of three different "hypothetical" applications, as a function of the bandwidth allocated to them.

FIG. 2 illustrates QoS evolution of three different "hypothetical" applications as a function of the bandwidth allocated to them. The QoS requirements for each application may simply be defined by a set of specific values for parameters α, k and t, or a different set of parameters may be used.

One possible drawback of equation (3) is that the QoS estimate doesn't go down to zero even when the application/process is allocated no bandwidth whatsoever, as illustrated by two of the curves shown on FIG. 2. This can be corrected by using a modified version where the result is multiplied by $b_i/t_i$ for instance. However, this means that $b_i^*$, the critical value of $b_i$ for which $QoS_i=0.5$, is no longer simply given by:

$$b_i^* = t_i(1-k_i) \quad (4)$$

So, for the sake of mathematical simplicity and clarity, unless specified otherwise, specific embodiments of the invention will be described with reference to the unmodified version of equation (3), although it will be understood that embodiments of the invention may operate in accordance with the modified version, and a variety of alternative equations.

It should be noted that there is a family of functions similar to (3) exhibiting a similar sigmoid signature that could be used instead. These would in general incorporate parameters equivalent to $\alpha$, k and t (or some combination or variation thereof) in order to define the QoS profile of a given application. Whether using the functions specifically introduced above, variants thereof, piecewise, hand-designed functions, user-profile dependent functions, or other functions, it will be understood that a key element of preferred embodiments of the invention will in general involve using a unified framework to evaluate, compare and whenever possible reconcile the specific QoS requirements of concurrent applications.

Maximizing Average QoS

Let us consider the case of two competing processes belonging to two different application types, the parameter values of which are respectively ($\alpha_1=2$, $k_1=0.25$ and $t_1=30$) and ($\alpha_2=4$, $k_2=0.1$ and $t_2=15$).

Let us also assume that the total available bandwidth B is 40 units, so that it is obvious that it is impossible to meet simultaneously both targets ($t_1+t_2=45>B$).

The equal share option would see each process being allocated half of the bandwidth, namely 20 units, resulting in $QoS_1=0.36$ and $QoS_2=1$, calculated using expression (3). The proportional share scenario would require calculating $\gamma$ so that $$b_1+b_2=\gamma(t_1+t_2)=B \quad (5)$$

which in this case means $\gamma\sim0.89$, resulting in $QoS_1\sim0.81$ and $QoS_2\sim0.32$.

What we suggest is to use expression (3) to choose $b_1$ and $b_2$ so as to maximize $QoS_1+QoS_2$. This is illustrated in FIG. 3.

Figure 3:
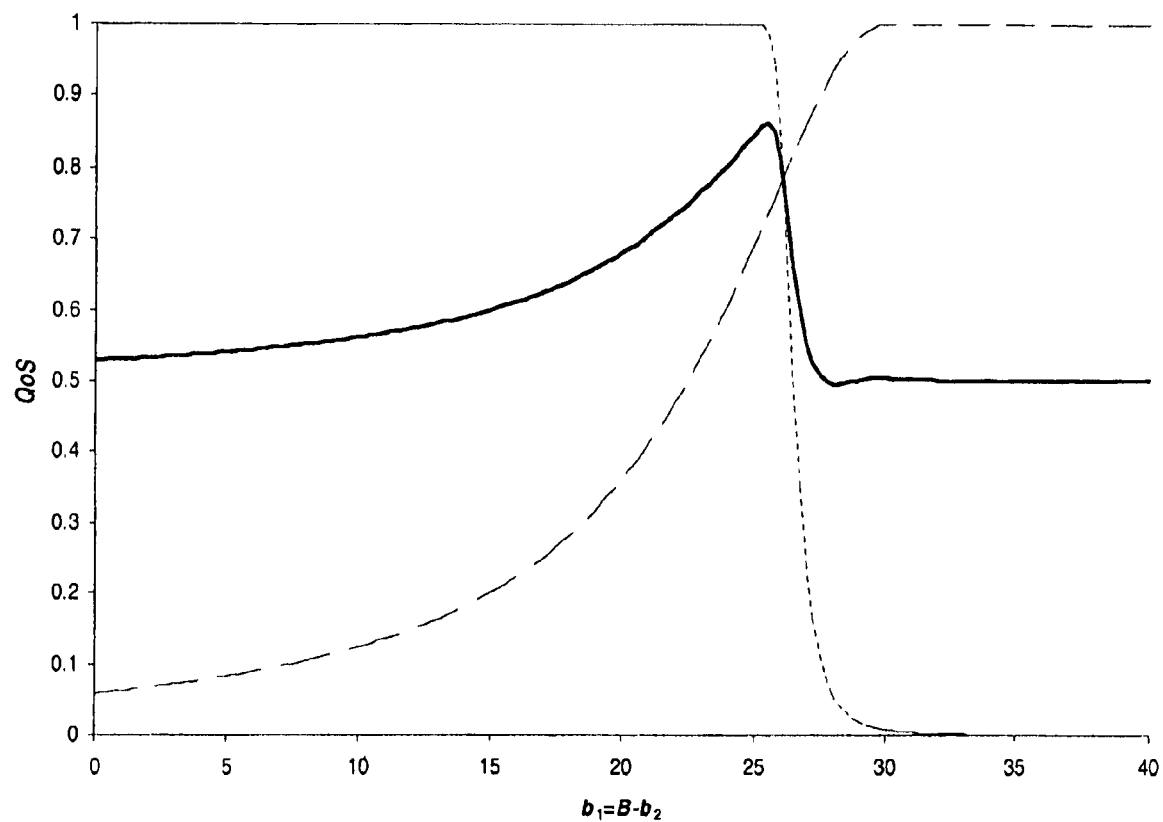
FIG. 3 is a graph showing curves respectively signifying possible Quality of Service levels for two applications and the average of the two levels as a function of the bandwidth allocated to the first of those two applications.

FIG. 3 illustrates QoS for what we will refer to as application-1 (dashed line), application-2 (dotted line) and the average of these two applications (thick line) as a function of $b_1$ (bandwidth allocated to application-1).

In this simple example, the optimal solution (with respect to maximising average QoS) involves allocating 25.5 units of bandwidth to process-1 and 14.5 to process-2, resulting in $QoS_1\sim0.73$ and $QoS_2\sim0.99$, average $\sim0.86$ (versus $\sim0.68$ for equal share and $\sim56$ for proportional share).

Practical Implementation

Simple algorithmic techniques can be used to identify an approximate solution when dealing with more difficult situations involving multiple applications in which identifying the true optimum could become too complex for real-time management purposes.

According to equations (3) and (4), when $b_i=b_i^*=t_i(1-k_i)$, $QoS_i=0.5$ (whatever $\alpha_i$). We suggest using some function of the relative threshold $k_i$ to define the minimum acceptable QoS level. At present, we use a variable $\gamma$, comprised between zero and one, such that:

$$B \leq \sum_{i=1}^{n} b_i \quad (6)$$
$$b_i = t_i(1-k_i\gamma')$$

with n being the total number of concurrent applications, each of them potentially with different QoS requirements. First, we determine whether the condition expressed in (6) is verified for $\gamma=1$. If it isn't, then it means that, given the constraint on B, it is impossible for all concurrent applications/processes to simultaneously reach their b* threshold. In this case, we call the "proportional share" allocation procedure (alternatively, this test could be performed as part of the admission control mechanism, in order to determine whether there is enough bandwidth to allow a new process).

If the condition in (6) is verified, then we estimate the lowest legal value of $\gamma$ (i.e. one that won't result in exceeding the total available bandwidth B) using a simple binary search. This very crude technique is enough to incorporate some basic application-specific concerns into the decision process, "smoothing" QoS distribution across multiple competing processes through differential allocation of the contended resource (i.e. bandwidth).

Figure 4:
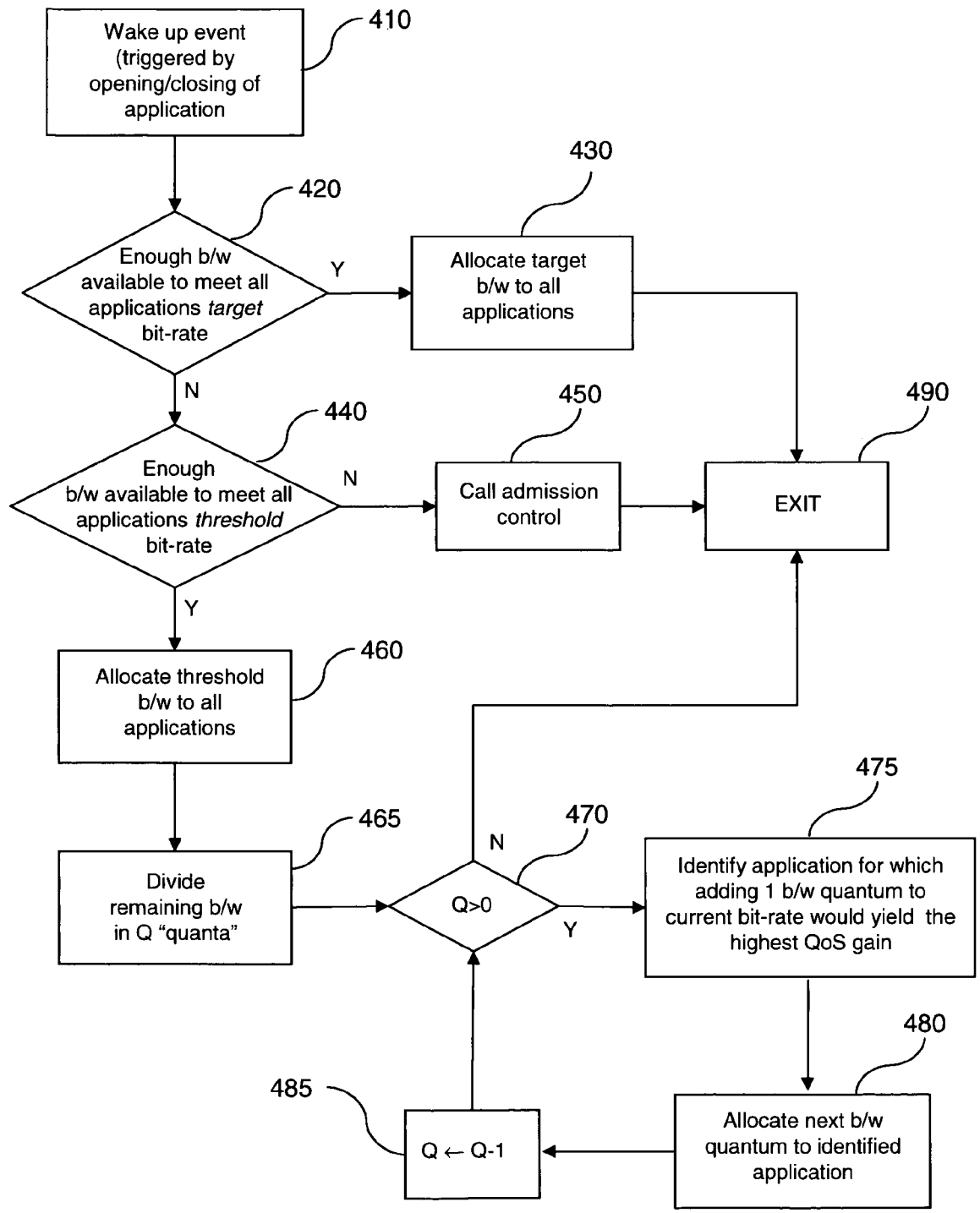
FIG. 4 is a flow chart illustrating a method of allocating bandwidth to network applications according to a preferred embodiment of the present invention.

With reference to the flow-chart of FIG. 4, a preferred method of allocating bandwidth according to the present invention in a computationally efficient manner will be described. Such a method may be performed by the broadband hub device 12 or one of the other components of FIG. 1, or by a separate dedicated device, for example.

Assuming the requirements of each network application and therefore the resulting QoS function remain the same during use of that application, it would be sufficient to call the bandwidth allocation procedure only on the opening or closing of one of the network applications, which happens at step 410. (In situations where this assumption is not true, the procedure could be called at regular time intervals, or in response to detected changes in requirements, for example).

At step 420, a determination is made as to whether enough "bandwidth" is currently available to the network for the respective target bit-rates of all the applications currently requiring bandwidth to be met. If so, the broker may simply allocate the relevant target bandwidth to each of those applications, as indicated at step 430, and the brokering process is complete (step 490) until such time as it is again necessary or appropriate to call the bandwidth allocation procedure, at which point this starts again from step 410.

If it is determined at step 420 that insufficient bandwidth is currently available to the network for the respective target bit-rates of all the applications currently requiring bandwidth, the process proceeds to step 440, at which a determination is made as to whether enough bandwidth is currently available to the network for the respective threshold bit-rates of all the applications currently requiring bandwidth to be met. If not, bandwidth brokering may be done using admission control (step 450) or another system, after which the brokering process is again complete (step 490) until such time as it is necessary or appropriate to call the bandwidth allocation procedure again, at which point this starts again from step 410. Alternatively, rules may determine that one or more applications, less-important applications, for example, be dropped, and the brokering process be attempted with the rest.

If it is determined at step 440 that sufficient bandwidth is currently available to the network for the respective threshold bit-rates to be met, the process proceeds to step 460, at which each application is allocated its threshold amount. At step 460, the remaining, as-yet-unallocated bandwidth is divided into an amount of quanta that would be determined by how finely it is desired to optimise the respective quality functions of the currently active network applications. Proceeding via step 470 to step 475, a determination is made as to which of the network applications would yield the highest QoS gain if it were to receive one additional quantum of bandwidth, and at step 480, one quantum of bandwidth is allocated to that application. If, after subtraction of that quantum of bandwidth from the remaining, as-yet-unallocated bandwidth (step 485) the remaining amount of quanta is still positive (step 470), the process continues via step 475, 480 and 485 until all the remaining bandwidth has been allocated, after which the current brokering process terminates at step 490, as before until such time as it is necessary or appropriate to call the bandwidth allocation procedure again, at which point this starts again from step 410.

It will be understood that steps 460 to 485 are one way of ensuring that in situations wherein it is possible to allocate to each application an amount of bandwidth at least equal to its threshold, but it is not possible for each application to be allocated its target amount, the available bandwidth is allocated in a manner that takes account not only of the relevant threshold and target amounts, but also the slope of the quality function applicable for each network application. This slope is indicative of the "abruptness" of the drop in user-perceivable satisfaction with the performance of the application in suit, and by taking this into account, it is therefore possible to allocate bandwidth in such a way as to maximise the total (and hence the average) of an appropriately-weighted sum of the respective quality functions.

It should be noted that the bandwidth "quanta" can be of any convenient size: a smaller size would be able to lead to finer-grained resource allocation, while a larger size would result in fewer iterations, and a lower response time. Either way, identification of the application to be allocated the next available quantum could be based on a predefined, application-specific QoS function.

It will also be understood that other techniques including fully computational techniques may be used, but depending on the complexity of the quality functions used and the amount of network applications "competing" for bandwidth, a numerical iteration procedure such as that described above may be more appropriate than a fully computational optimisation technique that may well involve a complex differentiation procedure.

The invention claimed is:

1. A method of allocating a network resource between a plurality of network applications, comprising:
    obtaining, for each of said plurality of network applications, parameters defining a quality function indicative of quality of service obtainable as a function of the amount of said network resource available to that network application, said parameters comprising:
        (i) a first measure indicative of a target amount of said network resource that said application requires in order for said application to perform at a level substantially at or above a first predetermined performance level;
        (ii) a second measure indicative of a threshold amount of said network resource that said application requires in order for said application to perform at a level substantially at or above a second predetermined performance level, said second predetermined performance level being lower than said first predetermined performance level;
        (iii) a performance change rate measure indicative of a rate of change of a predetermined measure of performance of said application with respect to amount of said network resource allocated to said application;
    then allocating proportions of said network resource respectively to each of said network applications in such a way as to optimise a predetermined function dependent on said first measures, said second measures and said performance change rate measures obtained in respect of each of said plurality of network applications.

2. A method according to claim 1, wherein in the event that a sufficient amount of said network resource is available to allocate, to each of said network applications, the respective threshold amount of said network resource, but an insufficient amount of said network resource is available to allocate, to each of said network applications, the respective target amount of said network resource, said step of allocating comprises:
    allocating to each of said network applications the respective threshold amount of said network resource;
    dividing a remaining amount of said network resource into a plurality of additional allocations;
    determining, with reference to one or more of said parameters in respect of each network application, the network application whose quality function would change in such a way as to be indicative of the greatest increase in quality of service were that network application to be allocated one of said additional allocations, and allocating one of said additional allocations to that network application;
    and repeating the previous step in respect of successive ones of said additional allocations until said plurality of additional allocations have each been allocated.

3. A method according to claim 1, wherein the quality function of each of at least two network applications has a respective threshold separating an acceptable quality of service and an unacceptable quality of service, and has a finite slopes at least in a range of amounts of said network resource available to that network application within which the quality of service obtainable changes between said acceptable quality of service and said unacceptable quality of service.

4. A method according to claim 1, wherein said network resource comprises bandwidth.

5. A method according to claim 1, wherein said network resource comprises a data processing capability.

6. A method according to claim 1, wherein said parameters are obtained by monitoring usage of one or more of said network applications by at least one user.

7. A method according to claim 1, wherein said parameters are obtained from data received relating to usage of one or more of said network applications by at least one user.

8. A method according to claim 1, wherein said parameters are obtained from non-user-specific characteristics of said network applications.

9. Apparatus for allocating a network resource between a plurality of network applications, comprising:
    parameter obtaining means arranged to obtain, for each of said plurality of network applications, parameters defining a quality function indicative of quality of service obtainable as a function of the amount of said network resource available to that network application, said parameters comprising:
        (i) a first measure indicative of a target amount of said network resource that said application requires in order for said application to perform at a level substantially at or above a first predetermined performance level;
        (ii) a second measure indicative of a threshold amount of said network resource that said application requires in order for said application to perform at a level substantially at or above a second predetermined performance level, said second predetermined performance level being lower than said first predetermined performance level;
        (iii) a performance change rate measure indicative of a rate of change of a predetermined measure of performance of said application with respect to amount of said network resource allocated to said application;
    and allocating means arranged to allocate proportions of said network resource respectively to each of said network applications in such a way as to optimise a predetermined function dependent on said first measures, said second measures and said performance change rate measures obtained in respect of each of said plurality of network applications.

10. Apparatus according to claim 9, said allocating means being arranged such that in the event that a sufficient amount of said network resource is available to allocate, to each of said network applications, the respective threshold amount of said network resource, but an insufficient amount of said network resource is available to allocate, to each of said network applications, the respective target amount of said network resource, said allocating means allocates to each of said network applications the respective threshold amount of said network resource; divides a remaining amount of said network resource into a plurality of additional allocations; determines, in respect of successive ones of said additional allocations and with reference to one or more of said parameters in respect of each network application, the network application whose quality function would change in such a way as to be indicative of the greatest increase in quality of service were that network application to be allocated one of said additional allocations, and allocates one of said additional allocations to that network application.

* * * * *